Aug. 15, 1961     J. L. DENNISTON     2,996,047
ACTUATING MEANS
Filed Jan. 9, 1959
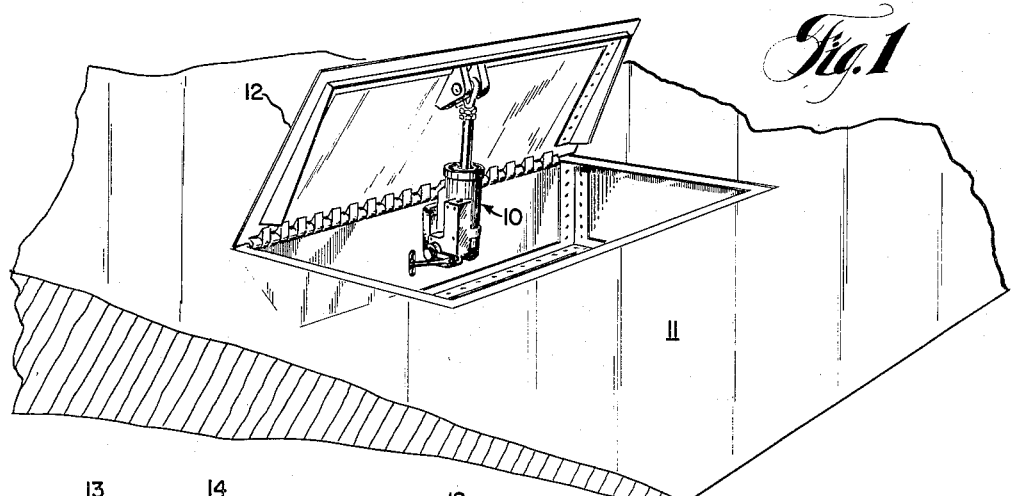
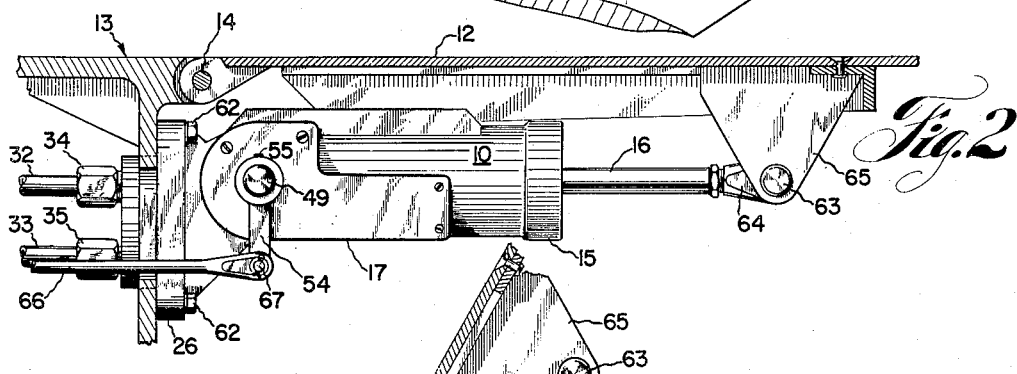
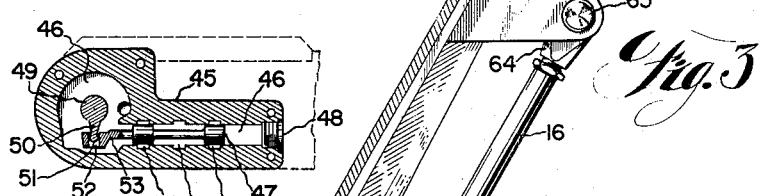
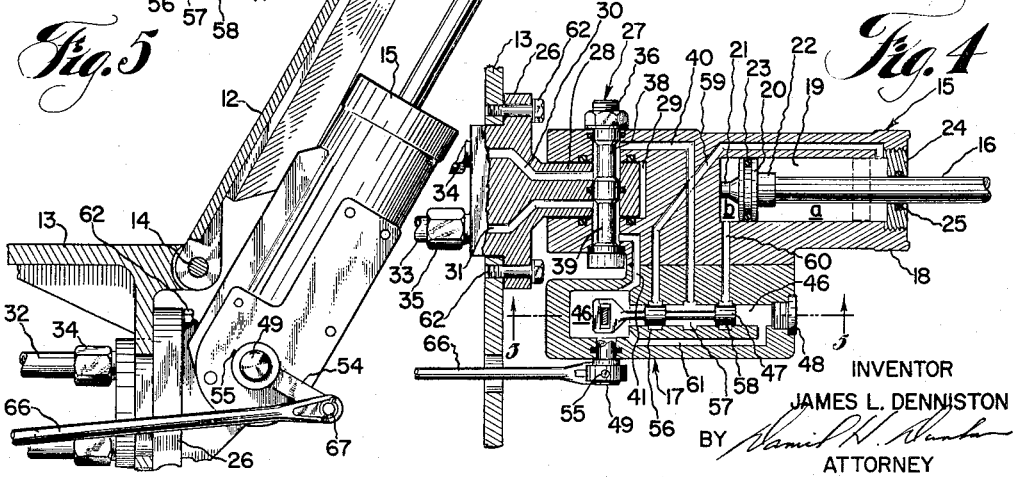
INVENTOR
JAMES L. DENNISTON
BY
ATTORNEY

United States Patent Office 2,996,047
Patented Aug. 15, 1961

2,996,047
ACTUATING MEANS
James L. Denniston, Columbus, Ohio, assignor to North American Aviation, Inc.
Filed Jan. 9, 1959, Ser. No. 785,812
7 Claims. (Cl. 121—41)

This invention relates to an actuating means which utilizes pressurized fluid as an operating medium, and which has an improved follow-up control arrangement provided therein.

It is an important object of my invention to provide an actuating means which may be advantageously utilized in those applications wherein it is required that a lever-like device be moved through a large angular displacement.

Another object of this invention is to provide a fluid actuator, having a directional control valve which is directly associated therewith and having a pivotally supported body portion, with an arrangement for obtaining improved follow-up regulation of the control valve element throughout large angular displacements of the body portion.

Another object of this invention is to provide an actuator with means for obtaining a follow-up type movement control action which has a uniform response characteristic throughout substantial angular displacements of the actuator.

A still further object of my invention is to provide an improved actuator having features whereby movement of the actuator may be effectively controlled throughout large angular displacements with a comparatively simple operating linkage.

Another object of this invention is to provide an actuating means having a minimum size and having a relatively simple configuration, each with respect to applications requiring movement of a lever-like device throughout substantial angular displacement ranges.

Another object of this invention is to provide an actuating means which may be readily manufactured, which may be economically maintained, and which has a high degree of operational reliability.

Other objects and advantages of this invention will become apparent during consideration of the drawings and detailed description.

In the drawings:

FIG. 1 illustrates portions of an airplane in combination with an actuating means having the features of this invention;

FIG. 2 is a side view of the actuating means of FIG. 1 in a retracted position;

FIG. 3 is a side view of the actuating means of FIG. 1 in an extended position;

FIG. 4 is a schematic plan sectional view of the actuating means illustrated in FIGS. 1 through 3; and FIG. 5 is a vertical sectional view of the actuating means of FIGS. 1 through 3 taken at line 5—5 of FIG. 4.

Actuating means 10 incorporates the features of this invention, and is illustrated in FIG. 1 in association with an aircraft wing 11 and movable spoiler component 12. Component 12, which is an aerodynamic surface, is attached to support structure 13 by pivot means 14. An actuator which incorporates the features of this invention may be advantageously utilized in other applications wherein it is also required that a lever-like device be moved through a large angular displacement. In connection with aircraft, such applications may relate to flap, deflector, elevator, or rudder actuation, or the like.

Actuator 10 includes a cylinder assembly 15, a rod member 16 which projects from within the cylinder assembly and which is extendible and retractable relative thereto, and a follow-up type valve assembly 17 for controlling extension and retraction of rod member 16. Cylinder assembly 15 is provided with a body portion 18 having an internal chamber 19 for receiving high-pressure operating fluid. A piston component 20 is attached to rod 16 and is contained within chamber 19 to separate chamber portions *a* and *b*; also, projection 21 and shoulder 22 are associated with piston component 20 to limit the extent of piston movement within chamber 19.

A conventional O-ring type seal 23 is provided on piston component 20 to prevent the passage of fluid from chamber portion 19*a* to chamber portion 19*b* and to prevent the passage of fluid from chamber portion 19*b* to chamber portion 19*a*. Cylinder end 24 incorporates a like seal 25 and cooperates with body 18 to close-off chamber portion 19*a*. Cylinder body 18 includes internal passageways for transmitting fluid to and from chamber portions 19*a* and 19*b*; details regarding such passageways will be provided hereinafter.

Cylinder assembly 15 also includes components for use in mounting body portion 18 to supporting structure; the mounting arrangement essentially includes a support fitting 26 and a swivel means 27 which connects body 18 to support fitting 26. Fitting 26 is provided with a projecting portion 28 that is received into a recess 29 provided in the end of cylinder body 18 opposite end component 24. Also, support fitting 26 is provided with passageways 30 and 31 for conducting fluid from and to the fluid supply and return lines 32 and 33, respectively. Conventional fittings 34 and 35 may be used to connect lines 32 and 33 to supporting fitting 26 and the proper passageways therein.

Swivel means 27 functions as an axis of rotation for body portion 18 relative to support fitting 26. As noted in FIG. 4, swivel means 27 includes a shaft member 36 provided with spaced-apart longitudinal sections 38 and 39 of reduced diameter. For ease of installation, swivel means 27 may be provided with the illustrated shoulder portion at one end with the illustrated threaded means arrangement at the opposite end. When the actuating means is properly assembled, the reduced diameter sections 38 and 39 serve to partially define annular passageways for porting operating fluid from passageways 30 and 31 to passageways 40 and 41, respectively. Conventional O-ring seals are utilized to prevent the leakage of fluid from the assembly comprised of body portion 18, support fitting 26, and swivel means 27.

Details of follow-up type valve assembly 17 are best illustrated in FIGS. 4 and 5. Assembly 17 is illustrated as comprising a body 45, an internal chamber referenced as 46, and a valve member 47 which slides within chamber 46. One end of chamber 46 is closed by the plug component 48. Valve body 45 may be attached directly to cylinder assembly 15 by means not shown, or may comprise an integral part thereof. Rotatably supported in valve body 45 is actuating shaft 49; it is important that the actuating means 10 be arranged such that the longitudinal axis of shaft 49 coincides with the longitudinal axis of swivel fitting 27.

One portion of shaft 49 is provided with a projection 50 (FIG. 5) and with a cylindrical end 51 attached to projection 50. Component 51 cooperates with socket 52 provided in the extension 53 of valve member 47. Another portion of shaft 49, but outside body 45, is connected to the valve actuating arm 54 and is made non-rotatable relative thereto as through the set screw device 55. Internal chamber 46 is provided with enlarged chamber portions 56, 57, and 58 intermediate its extreme end portions. Such enlarged chamber portions communicate with passageways 59, 40, and 60, respectively. In addition, the end portions of chamber 46 are connected by the passageway 61. Passageway 41 communicates with the left end portion of chamber 46, and with the right end portion of chamber 46 through the connecting passageway 61.

Also shown in the drawings are the threaded fastener means 62 which attach support fitting 26 to the structural support member 13. Pivot connection 63 is utilized to attach end portion 64 of rod member 16 to a bracket 65 projecting from the lever-like surface designated 12. For large angular displacements of component 12, it is preferred that actuating means 10 be located in generally parallel relation with respect thereto. Mechanical linkage 66 is connected to valve actuating arm 54 by the pivot means 67.

Retraction and extension of rod member 16 is controlled by properly porting a relatively high-pressure fluid operating medium to chamber portions 19b and 19a. This is accomplished through control of the flow of fluid from lines 32 and 33 by valve assembly 17. Regulation of valve assembly 17 is obtained through relative movement of valve actuating arm 54 by the mechanical linkage 66 connected thereto. When valve assembly 17 is in a "neutral" condition, the flow of fluid to and from internal chamber portions 19a and 19b is prevented by the enlarged portions of valve member 47 which block fluid flow between chamber portions 57 and 56 and between chamber portions 57 and 58. The neutral condition is best illustrated in FIGS. 4 and 5.

To move rod portion 16 to the right from its FIG. 4 position, valve member 47 must be displaced rightward with respect to valve body 45. This may be accomplished by rotating valve actuating arm 54 counter-clockwise with respect to the body portion 45. As valve member 47 is moved relatively rightward, enlarged chamber portion 58 is uncovered and communicates with enlarged chamber portion 57 through an intermediate section of chamber 46. High-pressure fluid contained in line 32 is then ported to chamber portion 19b by way of passageway 30, the annular passageway partially defined by reduced diameter section 38, passageway 40, and passageway 60. This will cause rod 16 to be moved rightward by piston 20 if the pressure of the operating fluid is sufficiently high. The fluid displaced from chamber portion 19a is transmitted to return line 33 by way of passageway 59, enlarged portion 56, which is also uncovered as member 47 is moved to the right, the left end portion of chamber 46, passageway 41, the passageway partially defined by reduced diameter section 39, and passageway 31.

As rod member 16 is extended with respect to cylinder body 18, component 12 is caused to rotate counter-clockwise about hinge point 14, and the body 18 is caused to rotate counter-clockwise about the longitudinal axis of swivel means 27. However, when the body portion 18 has been rotated through a degree which corresponds to the extent of rotation of valve actuating arm 54 about the axis of shaft 49 by linkage 66, the valve relation illustrated in FIGS. 4 and 5 will be re-established to thereby prevent further rotation of the actuating means. This form of follow-up action is near-instantaneous, and is substantially uniform throughout the extent of rotation of actuator 10. Further rotation of valve actuating arm 54 in a counter-clockwise direction about the axis of component 49 will cause an added degree of extension of rod member 16 and an added degree of rotation of cylinder body 18. However, the follow-up regulation described above continues and the actuator is moved only to an extent corresponding to movement of linkage 66 and rotation of arm 54.

Rotation of member 12 and actuator 10 in an opposite direction from an extended position (from the FIG. 3 position to the FIG. 2 position) is accomplished in an opposite manner. Valve member 47 is moved leftward with respect to body 45 and from its "neutral" position. Such is accomplished by clockwise rotation of arm 54 about its pivot axis. High-pressure fluid is ported from line 32 to chamber portion 19a by means of enlarged chamber portions 56 and 57. Fluid displaced from chamber 19b is returned to line 33 via enlarged chamber portion 58, the right end portion of chamber 46, passageway 61, and the left end portion of chamber 46. A follow-up control action identical to that described above is also obtained in connection with clockwise movement of rod 54 about its pivot axis, and corresponding clockwise movement of the body portion 18 of the actuator means about the axis of swivel fitting 27.

By arrangement illustrated and described with respect to FIGS. 1 through 5, an actuating means intended for use in applications involving movement of a lever-like device through large angular displacements may be provided with an improved follow-up control action. In the arrangement it is essential that the valve assembly utilized for controlling extension and regulation of the rod member be directly associated with the actuator body. Also, it is important that the pivot axis for use in obtaining longitudinal regulation of movement of the valve member be made to coincide with the axis of rotation of the actuating means.

From the above description it will be noted that the actuating means which I have provided is compact and has minimum requirements with respect to size and complexity of the mechanical linkage operating arrangements. These advantages are obtained in addition to the improved follow-up control arrangement set forth above.

It is to be understood that the form of the invention herewith shown and described is to be taken as a preferred embodiment of the same, but that various changes in the shape, size, and arrangement of parts may be resorted to without departing from the spirit of the invention or the scope of the subjoined claims.

I claim:

1. An actuator comprising, in combination: a body portion having an axis of rotation, a rod member moved by operating fluid introduced into a chamber contained in said body portion, and a follow-up type valve assembly controlling relative movement of said rod member by regulating the flow of operating fluid to the chamber containing in said body portion, said valve assembly having an axis of rotation relative to said body portion which is located in alignment with the axis of rotation of said body portion.

2. The actuator defined in claim 1, wherein said valve assembly includes a valve member and a rotatable arm member connected to said valve member, said arm member having an axis of rotation which coincides with the axis of rotation of said body portion.

3. The actuator defined in claim 1, wherein a swivel means is connected to said body portion to provide a support therefor, said swivel means partially defining a passageway for conducting operating fluid to said body portion and having a longitudinal axis which is aligned with the axes of rotation of said body portion and said valve assembly.

4. A fluid-type actuating means comprising, in combination: a body portion, a support portion for carrying said body portion, swivel means rotatably connecting said body portion to said support portion and having a longitudinal axis, a rod member projecting from within a fluid chamber contained in said body portion and moved by pressurized fluid received in the chamber, and a follow-up type valve assembly carried by said body portion and controlling the flow of pressurized fluid to the chamber contained in said body portion to regulate movement of said rod member relative to said body portion, said valve assembly having an axis of rotation relative to said body portion which is located in alignment with the longitudinal axis of said swivel means.

5. The actuating means defined in claim 4, wherein said valve assembly includes a valve member and a rotatable arm member connected to said valve member, said arm member having an axis of rotation aligned with the longitudinal axis of said swivel means.

6. The actuating means defined in claim 5, wherein a rotatable actuating lever is provided for connection to an external operating linkage to regulate extension and retraction of said rod member relative to said body portion, said lever being connected to said valve member through said arm member and being rotated about an axis which is aligned with the axes of rotation of said swivel means and said arm member.

7. In a fluid-type actuator having a body portion which rotates about a relatively fixed axis, a follow-up valve assembly comprising: a valve body directly associated with said actuator body portion, a valve member contained within said valve body and regulating the flow of operating fluid to chambers contained in said actuator body portion, and linkage means connected to said valve member for moving said valve member relative to said valve body, said linkage means containing a relatively fixed axis of rotation aligned with the actuator body portion axis of rotation.

References Cited in the file of this patent
UNITED STATES PATENTS

| | | |
|---|---|---|
| 2,002,315 | Furgason | May 21, 1935 |
| 2,140,095 | Theed | Dec. 13, 1938 |
| 2,550,349 | Helz | Apr. 21, 1951 |
| 2,565,929 | Onde | Aug. 28, 1951 |
| 2,819,030 | Christensen | Jan. 7, 1958 |
| 2,855,900 | Elmer | Oct. 14, 1958 |
| 2,886,948 | Pomper | May 19, 1959 |